United States Patent
Julin et al.

(10) Patent No.: US 9,774,788 B2
(45) Date of Patent: Sep. 26, 2017

(54) PROVIDING AREA ZOOM FUNCTIONALITY FOR A CAMERA

(71) Applicant: Axis AB, Lund (SE)

(72) Inventors: Fred Julin, Genarp (SE); Martin Nilsson, Lund (SE)

(73) Assignee: Axis AB, Lund (SE)

(*) Notice: Subject to any disclaimer, the term of this patent is extended or adjusted under 35 U.S.C. 154(b) by 0 days.

(21) Appl. No.: 15/224,798

(22) Filed: Aug. 1, 2016

(65) Prior Publication Data
US 2016/0344942 A1    Nov. 24, 2016

Related U.S. Application Data

(63) Continuation of application No. 12/029,758, filed on Feb. 12, 2008, now abandoned.
(Continued)

(30) Foreign Application Priority Data

Feb. 16, 2007   (EP) ...................................... 07102569

(51) Int. Cl.
*H04N 5/232* (2006.01)
*G06T 3/40* (2006.01)
*H04N 5/262* (2006.01)

(52) U.S. Cl.
CPC .......... *H04N 5/23296* (2013.01); *G06T 3/40* (2013.01); *H04N 5/232* (2013.01);
(Continued)

(58) Field of Classification Search
CPC ............... H04N 5/23296; H04N 5/232; H04N 5/23206; H04N 5/23216; H04N 5/23293; H04N 5/2628; G06T 3/40
(Continued)

(56) References Cited

U.S. PATENT DOCUMENTS

| 5,528,289 A | 6/1996 | Cortjens et al. |
| 5,838,840 A | 11/1998 | King et al. |

(Continued)

FOREIGN PATENT DOCUMENTS

| CN | 1627790 A | 6/2005 |
| EP | 1 599 034 A2 | 11/2005 |

(Continued)

OTHER PUBLICATIONS

Working with Selections; Feb. 1, 2001; Adobe Photoshop 5.0; Tutorial; pp. 1-14; http://people.csail.mit.edu/fredo/Depiction/1_Introduction/Tutorial/Lesson01/Lesson01.pdf.
(Continued)

*Primary Examiner* — Oleg Survillo
(74) *Attorney, Agent, or Firm* — Volpe and Koenig, P.C.

(57) ABSTRACT

The invention relates to a method for adjusting a digital camera. The invention also relates to a corresponding device and a corresponding computer program. An original image recorded by the camera is received. The original image has an original aspect ratio. A first user input defining a center point of an area of interest within the original image is received. A second user input defining a perimeter for the area of interest of the original image is received. The perimeter for the area of interest has the same aspect ratio as the original aspect ratio. The camera view is adjusted based on the first user input and the second user input to provide a zoomed image of the defined area of interest. The zoomed image is centered on the center point defined by the first user input. Finally, the zoomed image is displayed to the user on a display screen.

15 Claims, 7 Drawing Sheets

Related U.S. Application Data (60) Provisional application No. 60/891,974, filed on Feb. 28, 2007.

(52) U.S. Cl.
CPC ..... *H04N 5/23206* (2013.01); *H04N 5/23216* (2013.01); *H04N 5/23293* (2013.01); *H04N 5/2628* (2013.01)

(58) Field of Classification Search
USPC .......................................................... 348/148
See application file for complete search history.

(56) References Cited

U.S. PATENT DOCUMENTS

| | | | |
|---|---|---|---|
| 6,052,110 | A | 4/2000 | Sciammarella et al. |
| 6,396,507 | B1 | 5/2002 | Kaizuka et al. |
| 6,704,048 | B1 | 3/2004 | Malkin et al. |
| 6,714,692 | B1 | 3/2004 | Kim et al. |
| 6,971,063 | B1 | 11/2005 | Rappaport et al. |
| 7,554,522 | B2 | 6/2009 | Sinclair et al. |
| 2003/0122853 | A1 | 7/2003 | Kim |
| 2005/0151885 | A1 | 7/2005 | Choi |
| 2006/0026170 | A1 | 2/2006 | Kreitler et al. |
| 2006/0126894 | A1 | 6/2006 | Mori |
| 2008/0063389 | A1* | 3/2008 | Fang ................ G03B 13/36 396/56 |
| 2008/0104027 | A1 | 5/2008 | Imler et al. |
| 2009/0187863 | A1 | 7/2009 | Kaneshige et al. |
| 2010/0283796 | A1 | 11/2010 | Kramer et al. |

FOREIGN PATENT DOCUMENTS

| | | |
|---|---|---|
| JP | 8214206 A | 8/1996 |
| JP | 9506217 A | 6/1997 |
| JP | 10-200793 | 7/1998 |
| JP | 2001067485 A | 3/2001 |
| JP | 2003-323241 A | 11/2003 |
| JP | 2005276020 A | 10/2005 |
| JP | 2006178966 A | 7/2006 |
| KR | 10-2005-0082789 A | 8/2005 |
| WO | 9511566 A1 | 4/1995 |

OTHER PUBLICATIONS

Adobe Photoshop Basics Lesson 4a; Selection Tools; Feb. 1, 2001; About.com; 1 page; http://graphicsoft.about.com/od/photoshop/bllps504.ahtm.

Cropping, Panning and Zooming; Jan. 18, 2004; Vegas; Tutorial; pp. 1-5; http://users.wowway.com/'wvg/tutorial-14.htm.

* cited by examiner

PROVIDING AREA ZOOM FUNCTIONALITY FOR A CAMERA

CROSS REFERENCE TO RELATED APPLICATIONS

This application is a continuation of U.S. patent application Ser. No. 12/029,758, filed Feb. 12, 2008, which claims the benefit of U.S. Provisional Application No. 60/891,974 filed Feb. 28, 2007, which is incorporated by reference as if fully set forth.

FIELD OF INVENTION

The present invention relates to a method, in a computer system, for adjusting a camera, a computer program product, and a storage medium.

BACKGROUND

The present invention is intended for use in connection with digital cameras, such as pan/tilt/zoom digital cameras that are often used in various types of surveillance applications or video conferencing systems. One example of such a camera is described in U.S. Pat. No. 5,528,289, which describes a method for automatically adjusting a videoconferencing system camera to center an object.

As described in the above reference, a camera provides a digital image to a user. The image is displayed on a monitor display, such as a computer screen, using some kind of application software. The software allows the user to draw a rectangle around an object or area of interest in the displayed image, using a pointer. In response to the user drawing the rectangle, the camera is automatically positioned so as to center the object in the monitor display and adjust the zoom and focus so that the designated area in the rectangle fills the display. The rectangle is drawn by the user by placing the pointer at a desired pointer starting point (PSP), corresponding to a corner of the rectangle, dragging the pointer diagonally across the area of interest, and releasing the mouse button at a pointer ending point (PEP), corresponding to the corner of the rectangle diagonally across from the PSP. Once the rectangle has been drawn, a controller calculates a center point of the rectangle, based on the PEP and the PSP. The controller then calculates a difference between the calculated center point and the midpoint of the monitor display, to determine the pan and tilt of the camera necessary to center the desired picture on the monitor display. Finally, the controller performs a set of calculations to determine how much to zoom to the new field of view, and instructs the camera to focus, either by a focus process or by a memory process, which ends the procedure.

A problem associated with the above approach arises when a user attempts to zoom in on a particular object of interest. Since the rectangle is drawn with the PSP and the PEP in two opposite corners of the rectangle, the likelihood that the user will be able to optimally include the object of interest within the drawn frame is rather low. Often too little or too much of the object of interest is displayed after the zoom, causing the user to repeat the drawing process several times.

U.S. Pat. No. 6,052,110 describes a method for zooming in or zooming out objects that are displayed on a display screen. The user selects a "zoom operation" from a toolbar menu. This causes a cursor to appear on the screen. The user positions the cursor to set a reference point, for example by clicking a mouse button. This causes a reference point indicator to be displayed on the screen. The reference point indicator in the illustrated embodiment is located on the perimeter of a circle. After the reference point has been set, the user can move the cursor away from the reference point. As long as the cursor is within the drawn circle, a zoom out operation occurs, and when the cursor is moved outside the perimeter of the circle, a zoom in operation occurs. The distance between the cursor position and the reference point determines the speed of the zoom operations. No region of interest is specified, and there is no feedback to a camera in this method.

SUMMARY

According to a first aspect, the invention relates to a method, in a computer system, for adjusting a camera. The method includes the steps of
  receiving an original image captured by the camera, the original image having an original aspect ratio;
  receiving a first user input defining a center point of an area of interest of the original image;
  receiving a second user input defining a perimeter for the area of interest, the perimeter being set to the same aspect ratio as the original aspect ratio;
  adjusting the camera view based on the first user input and the second user input to provide a zoomed image of the defined area of interest, the zoomed image being centered on the center point defined by the first user input; and
  displaying the zoomed image to the user on a display screen.

Defining a center point makes it possible for the user to specify exactly what portion of the area of interest will be in the center of the zoomed image, and thus to optimally include an object of interest within the zoomed image. Furthermore, since the area of interest is set to the same aspect ratio as the original image, the drawn perimeter lets the user know exactly what portion of the original image will be visible in the zoomed image. This is in contrast to the prior art applications, in which the scaling can occur along different dimensions of the rectangle and a portion of the defined region of interest may not be shown in the zoomed image (or alternatively, more than the defined area of interest may be shown in the zoomed image).

According to a second aspect, the invention relates to a computer program for adjusting a camera. The computer program includes instructions corresponding to the steps of
  receiving an original image captured by the camera, the original image having an original aspect ratio;
  receiving a first user input defining a center point of an area of interest of the original image;
  receiving a second user input defining a perimeter for the area of interest, the perimeter having the same aspect ratio as the original aspect ratio;
  adjusting the camera view based on the first user input and the second user input to provide a zoomed image of the defined area of interest, the zoomed image being centered on the center point defined by the first user input; and
  displaying the zoomed image to the user on a display screen.

According to a third aspect, the invention relates to a digital storage medium comprising such a computer program. The computer program and the storage medium involve advantages corresponding to those of the method and may be varied similarly.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION OF THE PREFERRED EMBODIMENTS

Introduction to the Embodiments

In one embodiment, receiving the first user input includes receiving a user selection with a pointing device of a point in the original image. The pointing device can be, for example, a computer mouse or a joystick or other similar device. This enables the user to easily and exactly specify the center point of the area of interest.

In one embodiment, the point is defined by an (x, y) coordinate pair in an orthogonal coordinate system for the original image. This makes it easy to record the value of the center point and transmit the coordinates to the digital camera for repositioning. If the coordinate system is displayed along with the original image on the display screen, it also allows the user to specify the point using some kind of non-graphical input device, such as using a keyboard or voice control to specify the coordinate values for the point.

In one embodiment, receiving the second user input includes receiving a second location at a distance from the center point. This enables the user to quickly specify the perimeter of the area of interest, since the center point is known from the first user input, and the aspect ratio of the perimeter is known from the aspect ratio of the original image.

In one embodiment, the second location is defined by a user using a pointing device in a click-and-drag operation starting at the center point. Just like above, various types of pointing devices can be used. By performing a click-and-drag operation, that is, depressing a mouse button at the center point, holding the mouse button depressed while dragging the pointer to the desired location of the perimeter, and releasing the mouse button when the desired perimeter is reached, it may be easier for a user to control the location of the perimeter and thus give the user better control of optimally defining the area of interest.

In some embodiments, the distance between the center point and the second location is equal to half the distance between two diagonally opposite corners on the perimeter. That is, the user does not need to select the second location to be a location on the perimeter of the area of interest. On the contrary, the user can select the second location at any point and in any direction from the center point and the perimeter will be drawn based on the distance between the center point and the second location, with the proper aspect ratio. Conceptually, this can be thought of as selecting the second location on the perimeter of an imaginary circle centered in the center point and drawing the perimeter for the area of interest as a rectangle inscribed in this imaginary circle. Not being limited to defining the second location as a point on the perimeter for the area of interest creates great flexibility and ease of use for the user.

In some embodiments, drawing the perimeter of the area of interest occurs only when the second location is at a minimum distance from the center point. By including such a minimum threshold, it is possible to avoid unintentional zooming in applications that also have the ability to center an object by clicking on the object. That is, if the user's intention were to center the object by clicking on the object, and the user unintentionally moved the mouse a small amount while holding down the mouse button, no zooming would occur. On the other hand, if the user intended to draw a rectangle specifying an area of interest to zoom in on an object, the user would move the mouse to a second location that exceeds the minimum threshold. Thus, it is easy to distinguish separate zooming and centering operations from each other.

In some embodiments, the minimum distance is defined by a number of pixels in the original image. The number of pixels can be defined arbitrarily, for example, as a fixed number based on the sensitivity of the input device to user movements, or based on a particular user's motor skills, so that users having various degrees of motor skills can properly use the application interface.

In some embodiments, the minimum distance is defined by a zooming-capability of the camera. This enables accurate control of the zooming, since the user cannot define a perimeter of an area of interest that is too small and exceeds the digital camera's zooming capabilities. Furthermore, it allows the same user interface to be used for a wide range of digital cameras for which the zooming capability may not always be known. This can be very beneficial, for example, when a single user monitors several locations using a web interface.

In some embodiments, a zoom factor is calculated as the ratio of a diagonal distance between two corners of the area of interest and a diagonal distance between two corners of the original image, and providing the calculated zoom factor to the camera for use in adjusting the camera. Calculating the zoom factor in this manner provides a single value to send to the digital camera, so that the camera can adjust to the proper zoom level, and requires very little processing power and storage space. As the skilled reader realizes, a zoom factor smaller than "1" (that is, less than 100%) corresponds to zooming in, a zoom factor equal to "1" corresponds to no zooming, and a zoom factor larger than "1" (that is, more than 100%) corresponds to zooming out.

In some embodiments, at least a portion of the perimeter of the area of interest can extend outside the perimeter of the original image. This is typically the case when an object of interest that the user wishes to zoom in is located close to or at the edge of the original image. By extending the area of interest outside the image, it is possible to see details in the zoomed image that were not visible in the original image. This is not possible in prior art implementations, since the rectangular frame is drawn starting and ending in two corners of the rectangle, which means that the entire region of interest must be visible in the original image. As the skilled reader realizes, this applies both to zoomed-in images and to zoomed-out images.

In some embodiments, the area of interest includes the entire original image and the zoomed image is a zoomed-out image. This enables the user to perform similar operations for zooming out and zooming in, which creates an intuitive and easy to understand user interface. Furthermore, no separate on-screen controls are needed for zooming in and zooming out, which can save valuable real estate space on the display screen that can instead be used to show images. This is particularly important for display screens on mobile devices, which are generally smaller than the display screens on stationary devices, or in situations when multiple images are simultaneously shown on a single display.

DETAILED DESCRIPTION

Figure 1:
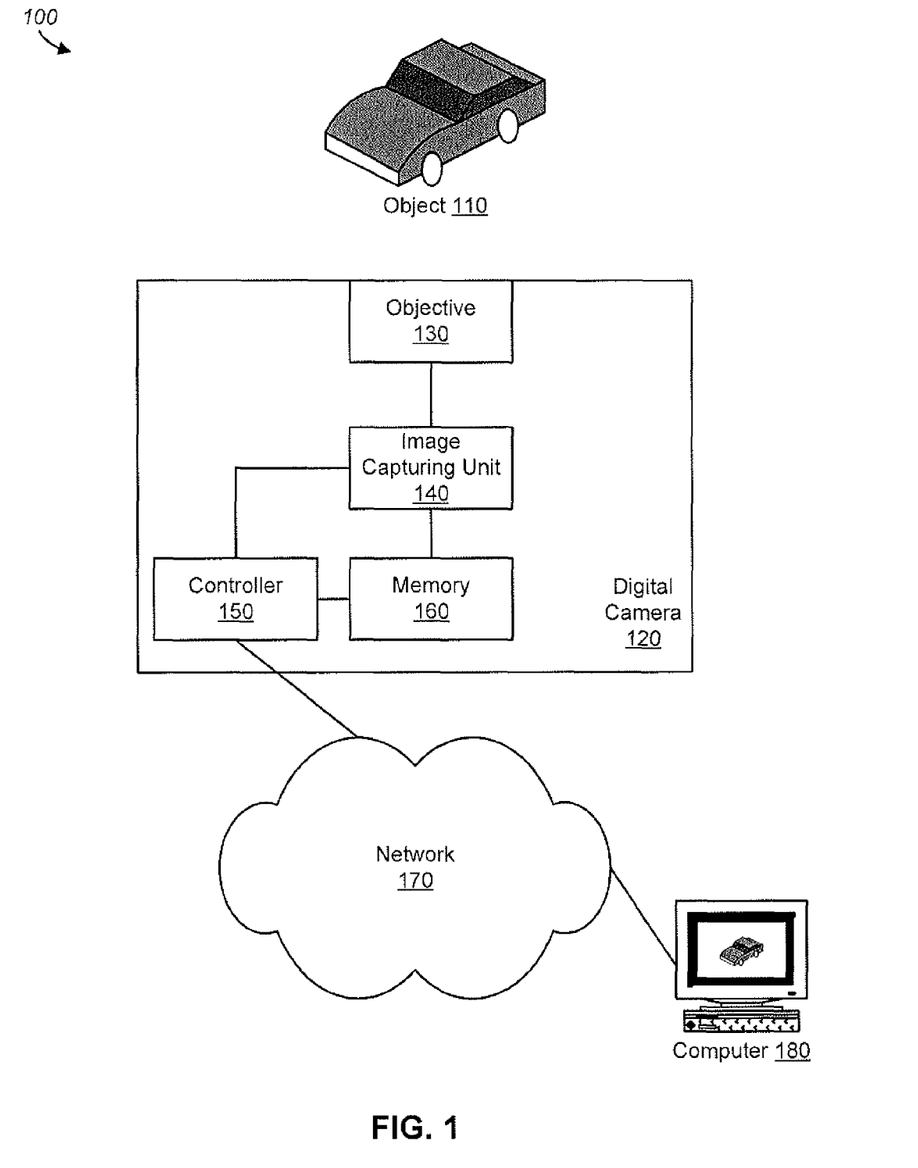
FIG. 1 shows a schematic view of a camera system in accordance with one preferred embodiment of the invention.

As shown in FIG. 1, a system 100 in accordance with one preferred embodiment of the invention includes a digital camera 120, which is illustrated in a basic modular form. The digital camera 120 is arranged to produce one or several digital image(s) of an object 110, which can be any physical object that is present in a scene optically covered by the digital camera 120. The digital camera 120 has an optical input in the form of a lens or objective 130.

The objective 130 is optically coupled to an image capturing unit 140, which is provided with appropriate means for producing a digital image representative of the object 100. In some embodiments, the image capturing unit 140 includes a Charge Coupled Device element (CCD), which is well-known a person of ordinary skill in the art. The image capturing unit 140 is coupled to a controller 150 and a memory 160. The controller 150 controls the image capturing unit 140. The controller 150 is also operatively connected to the digital memory 160 for storing images captured by the image capturing unit 140. The memory 160 can be implemented by any commercially available memory, such as an SRAM memory.

As shown in FIG. 1, the digital camera 120 can be connected to a wired or wireless network 170, such as an Ethernet or Token Ring network, which in turn can be part of the Internet. In such an application, the controller 150 of the digital camera 120 is provided with appropriate software for allowing the digital camera 120 to act as a network camera available on the network 170, that is, including a video server that can produce digital images.

The pan and/or tilt angle and zoom of the digital camera 120 can be set and changed by a user of the digital camera 120 by accessing the controller 150 through the network 170, using a computer 180 or other type of device capable of communicating with the controller 150 over the network 170. Alternatively, the pan and/or tilt angle(s) and zoom can be controlled from a computer directly connected to the digital camera 120.

Figure 2:
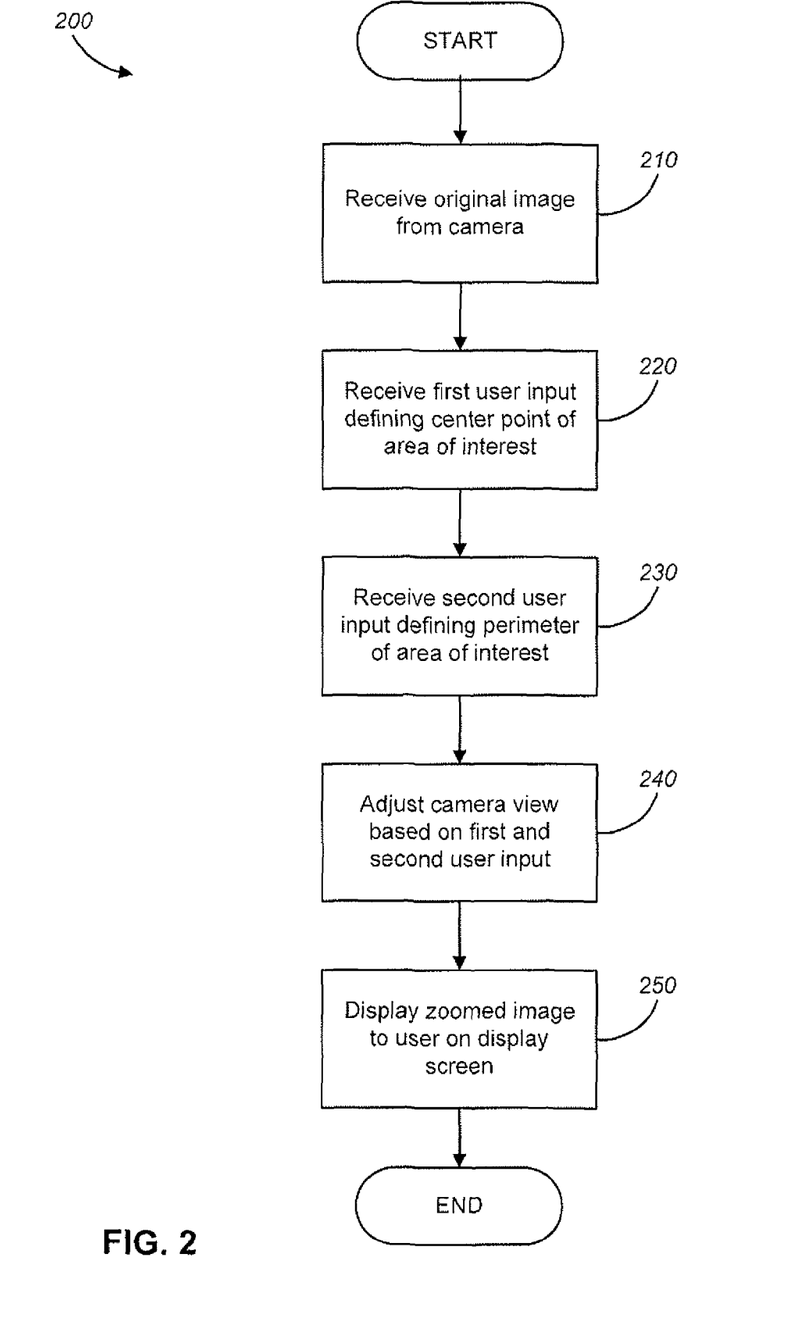
FIG. 2 shows a flowchart illustrating a process for adjusting a digital camera in accordance with one preferred embodiment of the invention.

FIG. 2 shows a process 200 for adjusting the digital camera 120 in accordance with a preferred embodiment of the invention. As can be seen in FIG. 2, the process 200 starts by receiving an original image from the camera 120 and displaying it to a user on the computer display screen 180, step 210. An example of an original image 300 can be seen in FIG. 3. The original image 300 has an aspect ratio that is defined by the ratio of the longer side of the original image 300 and the shorter side of the original image 300. The resolution of the original image 300 typically depends on the settings in the software that displays the original image 300 and/or the settings in the digital camera 120. The mechanisms for selecting image resolutions are well known to those of ordinary skill in the art, and will not be discussed here. Typical image resolutions are 640 by 480 pixels for VGA systems, and 704 by 576 pixels or 704 by 480 pixels for PAL systems.

Next, a first input is received from a user, which defines a center point of a region of an area of interest, step 210. In some embodiments, the user input is received in the form of a mouse click at a particular point of the image that the user would like to center in the zoomed image that is to be generated. It should however be realized that the input can be provided using any other type of graphical input device, such as a joystick. In some embodiments, the input can also be provided by a conventional keyboard or through voice control. These input mechanisms are particularly useful where the point can be easily identified by a coordinate pair. In the original image 300 in FIG. 3, the center point 310 identified by the user corresponds to the license plate of the white van on the right hand side of the original image 300.

Figure 3:
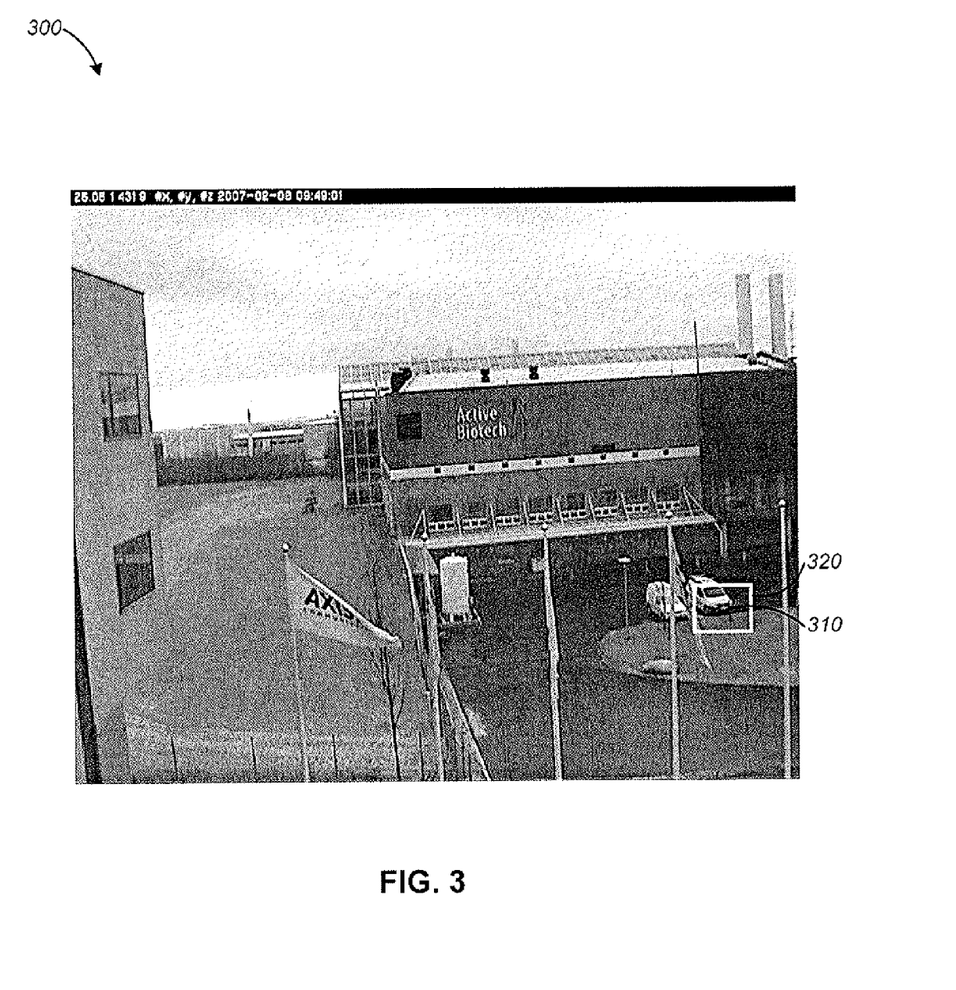
FIG. 3 shows a first original image from a digital camera in accordance with one preferred embodiment of the invention.

After receiving the first user input defining the center point 310, a second user input defining a perimeter of the area of interest is received, step 230. As can be seen in FIG. 3, the perimeter 320 defines an area of interest that will be shown in the zoomed image after the digital camera has adjusted its zoom level and pan/tilt positions. As can also be seen in FIG. 3, the area of interest has the same aspect ratio as the original image 300. That is, the ratio of the long side and the short side of the perimeter 320 is identical to the ratio of the long side and the short side of the original image 300. This makes it possible for a user to see exactly what will be included in the zoomed image after the digital camera has been adjusted, as opposed to conventional techniques that allow the user to draw a free form rectangle to define the area of interest, where some portion of the rectangle might be scaled away in the final image if the aspect ratio of the rectangle is different from that of the original image 300.

In some embodiments, the second user input is received in the form of a click-and-drag operation using a computer mouse, similar to what is done in conventional applications, and what is well-known to those of ordinary skill in the art. The difference in the present invention is that the click and drag operation starts at the center point 310 and not in one of the corners of the perimeter 320 for the area of interest. This allows the user to more accurately center an object of interest, such as the license plate in the original image 300. In some embodiments the perimeter 320 is drawn as the user drags the computer mouse out from the center towards the perimeter. Intuitively, the click-and-drag operation can be thought of as dragging the pointer outwards from the center of an imaginary circle along the circle's radius. While the user drags the pointer, the application software draws a perimeter 320 in the shape of a rectangle. The rectangle has the same aspect ratio as the original image 300 and is inscribed in the imaginary circle. It should further be noted that contrary to current implementations, the ending point of the click-and-drag operation does not have to be a point on the perimeter 320. Instead, the distance between the starting point and ending point of the click-and-drag operation is used to compute the dimensions and location of the perimeter 320.

Figure 7:
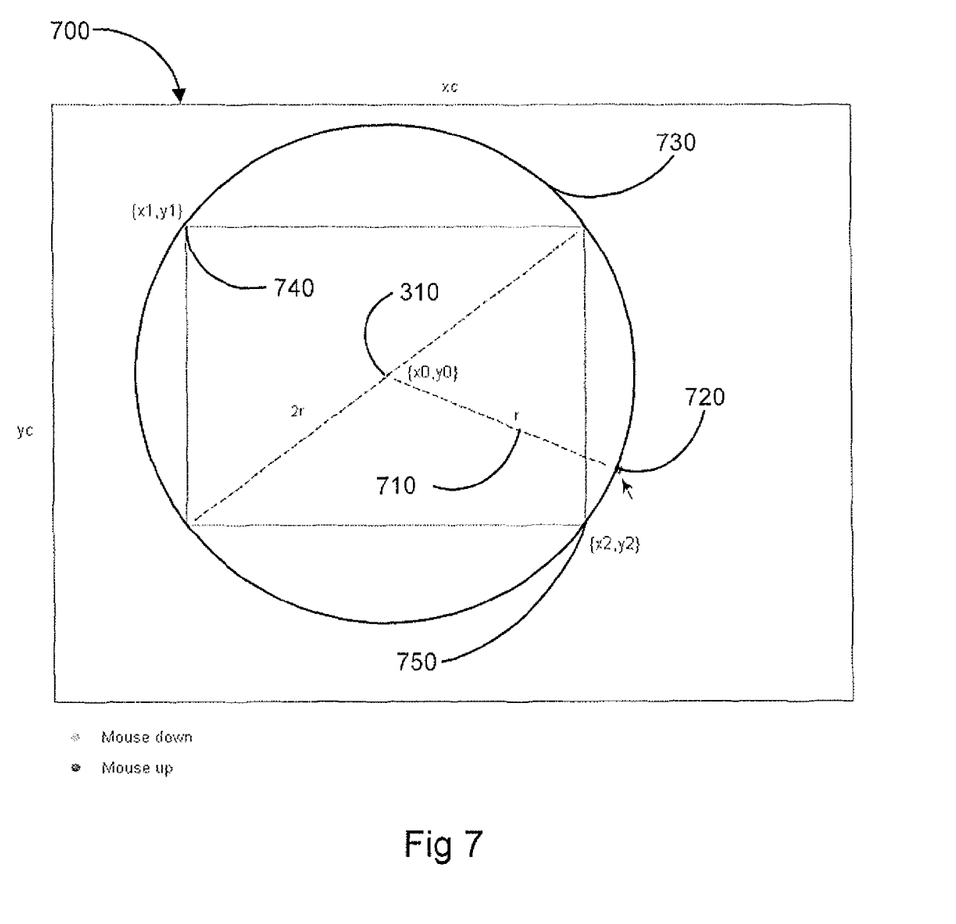
FIG. 7 shows a schematic view of how the dimensions of the perimeter of an area of interest are determined in accordance with one preferred embodiment of the invention.

FIG. 7 shows a schematic example of such an embodiment and how the dimensions of the perimeter 320 are computed. As can be seen in FIG. 7, a display screen 700 has the horizontal dimension xc and the vertical dimension yc. The user selects a center point 310 for the area of interest with the coordinates (x0, y0), depresses the mouse button, and moves the pointer along a radius r 710 to an endpoint 720 on the perimeter of an imaginary circle 730. This provides sufficient information for calculating the coordinates of two diagonally opposite corners of the perimeter, located on the perimeter of the imaginary circle 730, and keeping in mind that the perimeter 320 has the same aspect ratio as the display screen 700. The upper left corner 740 has the coordinates (x1, y1), and the lower right corner 750 has the coordinates (x2, y2). These coordinates are calculated as follows.

$$x1 = x0 - r^* \sin(\arctan(xc/yc))$$

$$y1 = y0 - r^* \cos(\arctan(xc/yc))$$

$$x2 = x0 + r^* \sin(\arctan(xc/yc))$$

$$y1 = y0 + r^* \cos(\arctan(xc/yc))$$

In other embodiments, the perimeter 320 is not drawn until the user releases the mouse button after completing the dragging. In yet other embodiments, the user does not have to click-and-drag, but can simply click a first time at the center point 310 and a second time at a location where the user desires to place the perimeter 320.

Some embodiments may contain a separate "center object function," which causes the camera to center on an object that is selected by the user, without zooming in on the object, similar to the first user input described above. In order to prevent unintentional zooming in the event that the user intended to perform a "center object" operation, but moved the mouse while holding down the button, some embodiments do not allow the perimeter 320 to be drawn until the cursor is at a minimum distance from the selected center point 310.

Alternatively, instead of not drawing a perimeter 320 until the minimum distance from the center point 310 has been reached, some embodiments draw the perimeter 320 regardless of the distance from the center point 310, but draw the perimeter 320 in varying colors. For example, a red perimeter 320 may be drawn while the cursor is too close to the center point 310, and the color of the perimeter 320 may switch to green when the cursor is further away from the center point 310 than the specified minimum distance.

As was described above, in some embodiments, this minimum distance between the center point 310 and the perimeter 320 is defined in terms of pixels, for example, an area of 8×8 pixels surrounding the center point 310, in the original image 300. In other embodiments, the minimum distance is defined based on the zooming capabilities of the camera. For example, when the user defines an area of interest that is so small that the camera would not be able to zoom in to the level desired by the user, no perimeter 320 would be drawn. Instead, the camera may do nothing or perform a center object operation. This approach is particularly useful when multiple cameras are controlled through the same interface, for example, in the case of a web interface for controlling several cameras.

In some preferred embodiments, the amount of zooming needed is computed by calculating the ratio of the diagonal distance between two opposite corners on the perimeter 320, and the diagonal distance between two opposite corners on the original image 300. The result gives a value greater than 0, where a value smaller than 1 corresponds to zooming in, a value larger than 1 corresponds to zooming out, and a value of 1 corresponds to no zooming. This value is often referred to as the zoom factor. As the skilled reader realizes, this value can also be expressed as a percentage value, where a value smaller than 100% corresponds to zooming in, a value larger than 100% corresponds to zooming out, and a value of 100% corresponds to no zooming. Having a single value for a zoom factor makes it easy to send the zoom data to the camera, and also makes it easy to determine whether the desired zooming in is within the cameras capabilities, as discussed in the previous paragraphs.

When the first user input defining the center point 310 and the second user input defining the perimeter 320 have been received, and the zoom factor has been calculated, the data is sent to the controller 150 in the camera 120. The controller 180 adjusts the camera view to tilt/pan/zoom, either through physically adjusting the camera 120 or through digital image processing, to the desired image view in accordance with methods that are well known to those of ordinary skill in the art, step 240. The tilt/pan operations and the zoom operation can occur simultaneously as part of a single operation or occur as separate steps. In one embodiment, the data that is sent from the computer 180 to the controller 150 includes an (x, y) coordinate pair for the center point 310, and the zoom factor, determined as described above.

Figure 4:
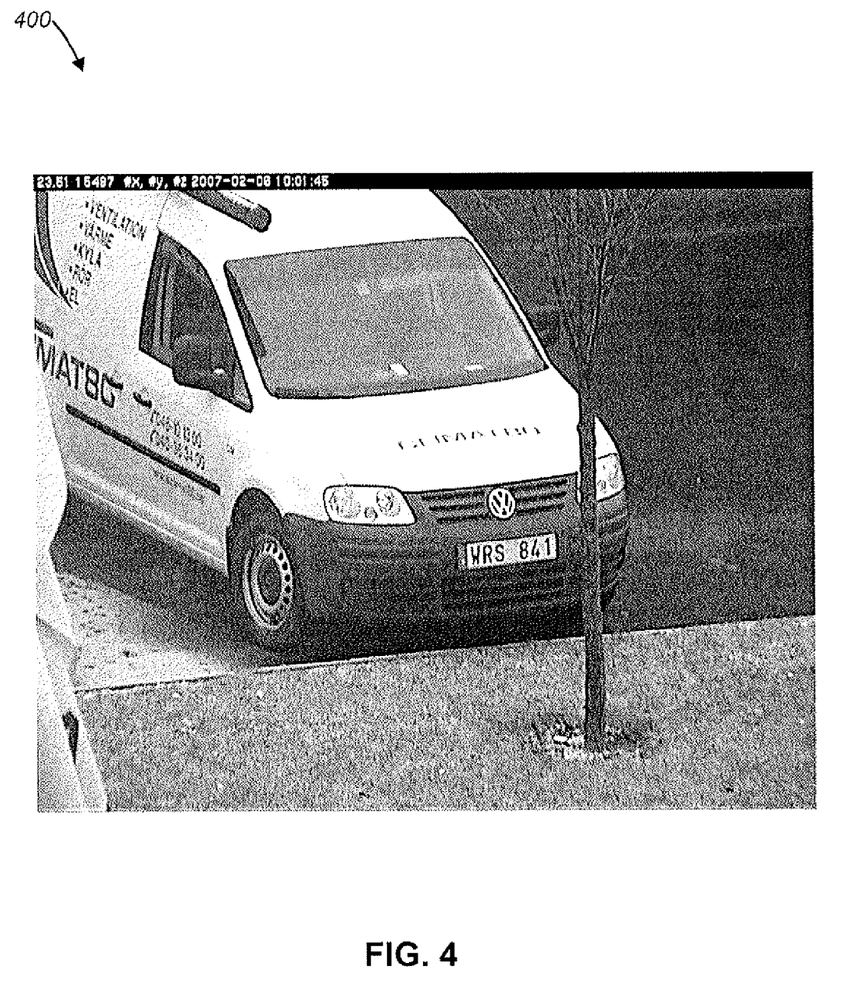
FIG. 4 shows a first zoomed image of a region of interest in the first original image in accordance with one preferred embodiment of the invention.

Finally, the zoomed image is displayed to the user on a display screen, step 250, which ends the process 200. FIG. 4 shows an example of a zoomed image 400 corresponding to the area of interest within the perimeter 320 in the original image 300. In the illustrated embodiment, the zoomed image 400 is shown at the same size and dimensions as the original image 300. As can be seen, the license plate, which was chosen as the center point 230, is centered and clearly visible in the zoomed image 400.

It should be noted that whereas the above discussion has been focused on zooming in, the same principles can also be used for zooming out. As the skilled reader realizes, zooming out can be accomplished by defining a perimeter 230 around an area of interest that is larger than the area of original image 300. The area of interest can include all or the original image, or a portion of the original image, for example, if the center point is placed close to an edge of the original image 300 and the area of interest is selected to be larger than the area of the original image 300. As a result, in these situations, the zoom factor will have a value that is greater than 100%. Similar to the case of zooming in, it is possible to define a threshold value for when to draw the perimeter 230. Again, this threshold value can be connected to the zooming capability of the digital camera 120. When it is not possible to zoom out any further, no perimeter 230 may be drawn, or the perimeter 230 may be drawn with a different color, analogous to the above discussion for the zooming in case. This method of zooming out is especially advantageous since it is intuitive to use for a user who is already familiar with the zooming-in methods described above. Furthermore, it is not necessary to have any on-screen controls for zooming in and zooming out, which may be especially useful when display screen real estate is scarce, for example, when there are several pictures on a display screen or when a picture fills the entire display screen, which often may be the case in smaller, portable displays.

Figure 5:
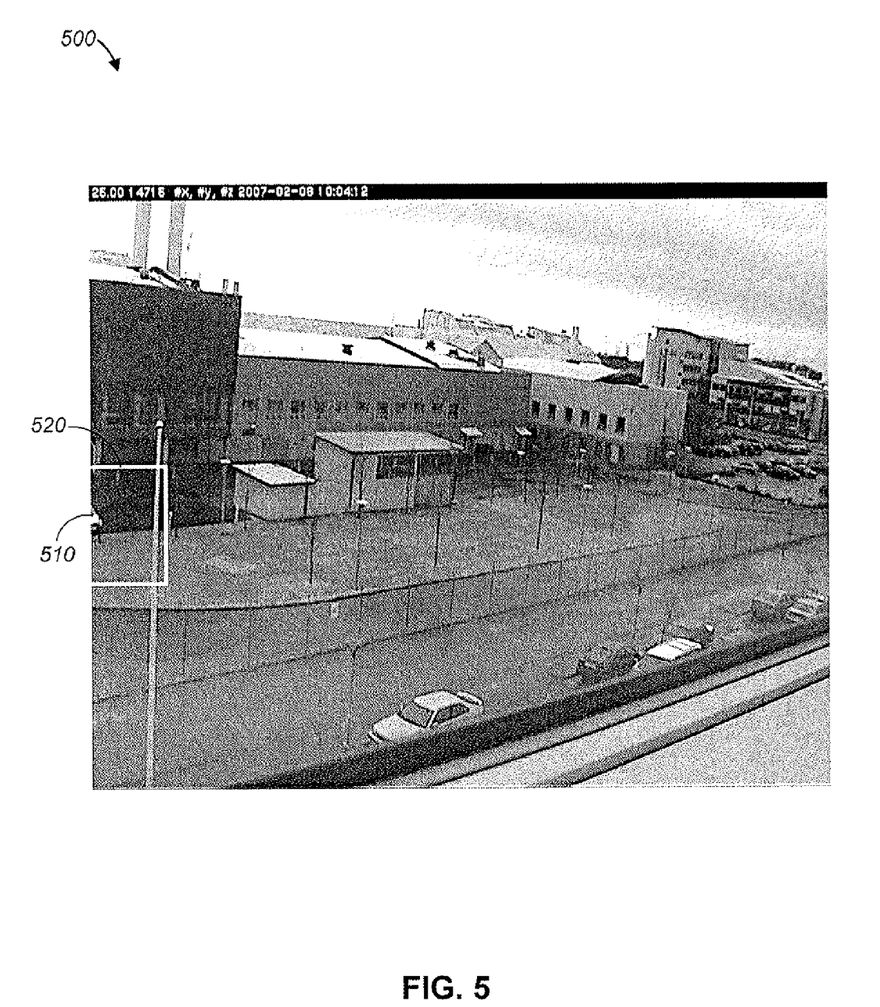
FIG. 5 shows a second original image from a digital camera in accordance with one preferred embodiment of the invention.

A further advantage with the zooming method described above is that it facilitates zooming in on objects located at the edge of the original image. FIG. 5 shows such a case, in which a user would like to zoom in on a white van 510 located at the left edge of the original image 500. Using the above described techniques, the white van 510 is selected as the center point, and the user performs a click-and-drag operation to define the perimeter 520 of the area of interest, which will be shown in the zoomed image. As can be seen in FIG. 5, only a portion of the perimeter 520 (approximately half the perimeter) is drawn within the original image 500. The rest of the perimeter 520 is located outside the original image 500 and is thus not drawn. However, in determining the zoom factor both the visible half and the non-visible half of the area of interest are used, just as was described above. It should be noted that also here, the aspect ratio of the area of interest, as defined by the perimeter 520, and the aspect ratio of the original image 500 is the same.

Figure 6:
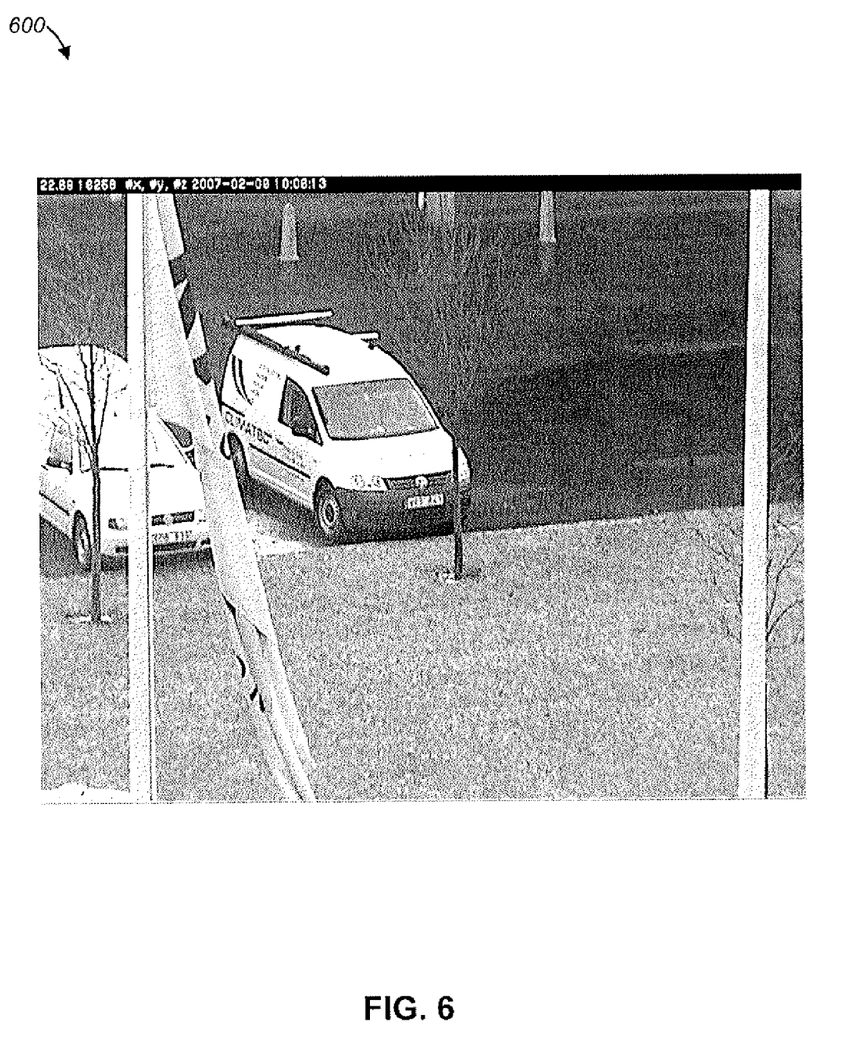
FIG. 6 shows a second zoomed image of a region of interest in the second original image in accordance with one preferred embodiment of the invention.

FIG. 6 shows the resulting zoomed image 600 of the area of interest defined in the original image 500. As can be seen in FIG. 6, the white van is located approximately at the center of the zoomed image 600 and another car and flagpole, which were not visible in the original image 500 can now clearly be seen. As the reader realizes, this greatly simplifies the user operations compared to the prior art technologies referenced above. In the prior art case, the user would first have to center the original image, so that the entire area to be zoomed in on would be visible, then draw a rectangle defining the area of interest, by starting and ending in two corners of the rectangle. Even so, the desired area of interest might not be displayed in the zoomed image, if the aspect ratio of the drawn rectangle is not identical to the aspect ratio of the original image. Thus, the embodiment shown in FIGS. 5 and 6 greatly simplifies the user manipulations and improves the accuracy compared to the prior art applications.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented y, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users. The computer system can also be programmed to provide a "pre-recorded tour" representing a command sequence that has been recorded by a user at an earlier point in time, using any of the above mentioned input devices. This recorded tour may include the zooming functionality discussed above.

Finally, the processor optionally can be coupled to a computer or telecommunications network, for example, an Internet network, or an intranet network, using a network connection, through which the processor can receive information from the network, or might output information to the network in the course of performing the above-described method steps. The network can be any combination of wired or wireless network, as is familiar to those of ordinary skill in the computer hardware and software arts. The information that is received over the network is often represented as a sequence of instructions to be executed using the processor and may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should be remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations of the invention have been described. Nevertheless, it will be understood that various modifications may be made without departing from the spirit and scope of the invention. For example, even though the area of interest has been described above as having the same aspect ratio as the original image 300, essentially any shape is possible for the area of interest. However a drawback may be that some portions of the image content in the area of interest may be omitted in the zoomed image due to the difference in aspect ratio between the original image 300 and the area of interest.

It should also be noted that while the pan/tilt/zoom operations have been described above as physical operations of the digital camera 120, these operations can also be implemented as digital image processing operations in a digital camera, such as a wide angle digital camera. Accordingly, other embodiments are within the scope of the following claims.

What is claimed is:

1. A method, in a computer system having a controller, for adjusting a camera view, comprising:
    at the controller:
        receiving an original image captured by a camera, the original image having an original aspect ratio;
        receiving a first user input defining a center point of an area of interest within the original image;
        receiving a second user input defining a perimeter of the area of interest, wherein the perimeter is set to the same aspect ratio as the original aspect ratio;
        inscribing the perimeter of the area of interested in an imaginary circle with a radius having endpoints defined by the center point and the second user input, wherein the second user input is on a perimeter of the area of interest and diagonally opposite corners of the perimeter are located on the perimeter of the imaginary circle;
        determining a zoom factor based on the ratio of the diagonal distance between the diagonally opposite corners of the perimeter and a diagonal distance between diagonally opposite corners or the original image;
        adjusting the camera view based on the center point and the zoom factor to provide a zoomed image of the area of interest within the original image, wherein the zoomed image is centered on the center point, wherein the adjusting includes adjusting a pan and tilt of the camera to include a non-visible portion of the area of interest that is located outside of the original image; and
        displaying the zoomed image to the user on a display screen.

2. The method of claim 1, wherein receiving the first user input includes receiving a user selection with a pointing device of a point in the original image.

3. The method of claim 2, wherein the point is defined by an (x, y) coordinate pair in an orthogonal coordinate system for the original image.

4. The method of claim 1, wherein receiving the second user input includes receiving a second location at a distance from the center point.

5. The method of claim 4, wherein the second location is defined by a user using a pointing device in a click-and-drag operation starting at the center point.

6. The method of claim 4, wherein the distance between the center point and the second location is equal to half the distance between two diagonally opposite corners on the perimeter.

7. The method of claim 6, wherein drawing the perimeter of the area of interest occurs only when the second location is at a minimum distance from the center point.

8. The method of claim 7, wherein the minimum distance is defined by a number of pixels.

9. The method of claim 7, wherein the minimum distance is defined by a zooming-capability of the camera.

10. The method of claim 1, wherein a zoom factor smaller than one corresponds to zooming in, a zoom factor equal to one corresponds to no zooming, and a zoom factor larger than one corresponds to zooming out.

11. The method of claim 1, wherein at least a portion of the perimeter of the area of interest extends outside the perimeter of the original image.

12. The method of claim 1, wherein the area of interest includes the entire original image and the zoomed image is a zoomed-out image.

13. The method of claim 1, wherein the zoom factor is a single value.

14. A non-transitory computer readable medium, having instructions recorded thereon that, when executed by a computing device, cause the computing device to perform operations comprising:
    receiving an original image captured by a camera, the original image having an original aspect ratio;
    receiving a first user input defining a center point of an area of interest within the original image;
    receiving a second user input defining a perimeter of the area of interest, wherein the perimeter is set to the same aspect ratio as the original aspect ratio;
    inscribing the perimeter of the area of interested in an imaginary circle with a radius having endpoints defined by the center point and the second user input, wherein the second user input is on a perimeter of the area of interest and diagonally opposite corners of the perimeter are located on the perimeter of the imaginary circle;
    determining a zoom factor based on the ratio of the diagonal distance between the diagonally opposite corners of the perimeter and a diagonal distance between diagonally opposite corners or the original image;
    adjusting the camera view based on the center point and the zoom factor to provide a zoomed image of the area of interest within the original image, wherein the zoomed image is centered on the center point, wherein the adjusting includes adjusting a pan and tilt of the camera to include a non-visible portion of the area of interest that is located outside of the original image; and
    displaying the zoomed image to the user on a display screen.

15. The non-transitory computer readable medium of claim 14, wherein the zoom factor is a single value.

* * * * *